United States Patent
Ren et al.

(10) Patent No.: US 11,983,789 B1
(45) Date of Patent: May 14, 2024

(54) GENERATION METHOD, DETECTION METHOD, GENERATION DEVICE, AND DETECTION DEVICE OF ZERO WATERMARKING FOR TRAJECTORY DATA, AND STORAGE MEDIUM

(71) Applicant: Nanjing Normal University, Nanjing (CN)

(72) Inventors: Na Ren, Nanjing (CN); Changqing Zhu, Nanjing (CN); Yuchen Hu, Nanjing (CN); Qianwen Zhou, Huai'an (CN); Heyan Wang, Baoding (CN)

(73) Assignee: NANJING NORMAL UNIVERSITY, Nanjing (CN)

( * ) Notice: Subject to any disclaimer, the term of this patent is extended or adjusted under 35 U.S.C. 154(b) by 0 days.

(21) Appl. No.: 18/412,497

(22) Filed: Jan. 13, 2024

(30) Foreign Application Priority Data

Aug. 18, 2023 (CN) .......................... 202311041918.6

(51) Int. Cl.
  *G06T 1/00* (2006.01)
  *G06F 21/16* (2013.01)
  *G06F 21/60* (2013.01)

(52) U.S. Cl.
  CPC ............ *G06T 1/0064* (2013.01); *G06F 21/16* (2013.01); *G06F 21/602* (2013.01)

(58) Field of Classification Search
  CPC ...... G06T 1/0064; G06F 21/16; G06F 21/602
  See application file for complete search history.

(56) References Cited

FOREIGN PATENT DOCUMENTS

| CN | 114897659 B | * 12/2023 | ............... G06T 1/00 |
| CN | 116582246 B | * 2/2024 | ............... H04L 9/00 |

OTHER PUBLICATIONS

Panah, A.S., Van Schyndel, R., Sellis, T. and Bertino, E., 2016. On the properties of non-media digital watermarking: a review of state of the art techniques. IEEE Access, 4, pp. 2670-2704.*
Martínez, S., Gérard, S. and Cabot, J., 2018. On watermarking for collaborative model-driven engineering. IEEE Access, 6, pp. 29715-29728.*
Nanjing Normal University (Applicant), Claims for CN202311041918.6 (allowed), Aug. 18, 2023.
CNIPA, Notification to grant patent right for invention in CN202311041918.6, Oct. 12, 2023.

\* cited by examiner

*Primary Examiner* — Zhitong Chen
(74) *Attorney, Agent, or Firm* — Zhigang Ma

(57) ABSTRACT

A generation method of zero watermarking for trajectory data, a detection method of zero watermarking for trajectory data, a generation device of zero watermarking for trajectory data, a detection device of zero watermarking for trajectory data, and a storage medium are provided. The generation method divides a trajectory based on a coordinate system constructed by trajectory feature points of trajectory data into blocks, and then the moment invariants of trajectory in each block are used to construct a watermark sequence, which can achieve copyright protection without modifying the trajectory data. In addition, since the generation method uses moment invariants which can represent overall features of the trajectory to construct the watermark sequence, the generation method has strong stability in the face of common attacks and can resist almost all common types of attacks.

10 Claims, 6 Drawing Sheets

Water Mark
FIG. 6a
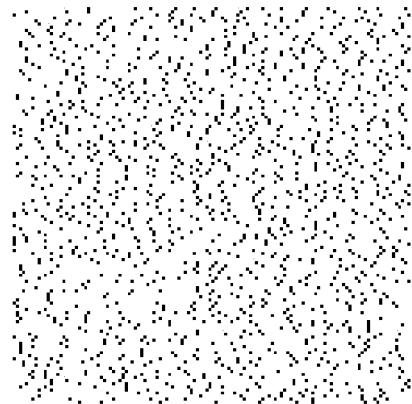
FIG. 6b
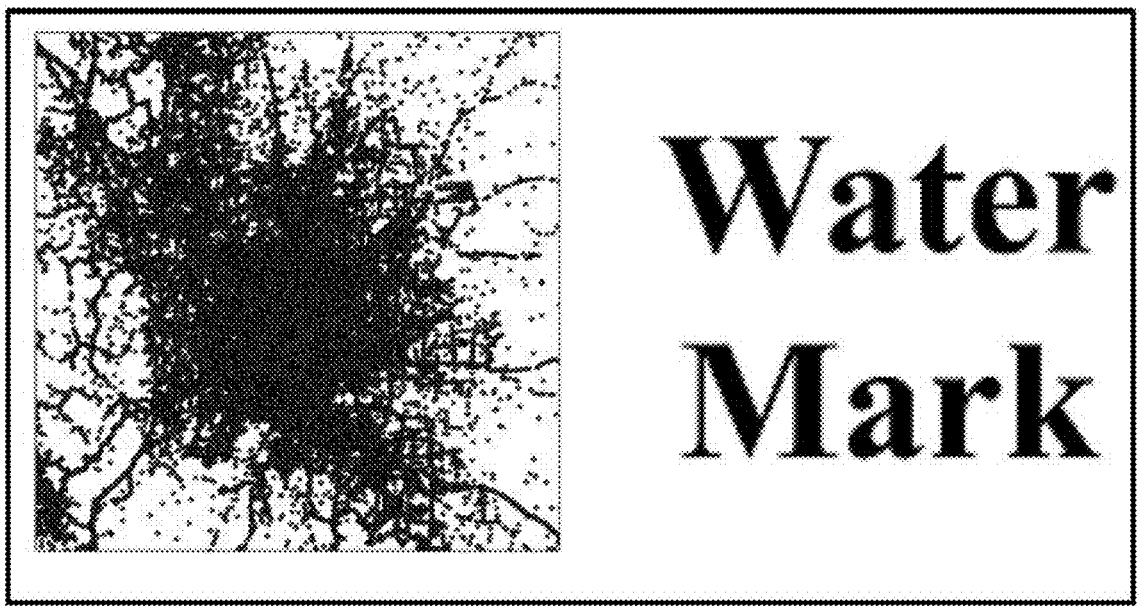
FIG. 7a

GENERATION METHOD, DETECTION METHOD, GENERATION DEVICE, AND DETECTION DEVICE OF ZERO WATERMARKING FOR TRAJECTORY DATA, AND STORAGE MEDIUM

TECHNICAL FIELD

The present disclosure relates to the field of geographic information security technology, and particularly to a generation method of zero watermarking for trajectory data, a detection method of zero watermarking for trajectory data, a generation device of zero watermarking for trajectory data, a detection device of zero watermarking for trajectory data, and a storage medium.

BACKGROUND

With the development of global positioning system (GPS) technology, trajectory data is widely used in travel behavior analysis, automatic driving, urban planning, public health and other fields. However, the trajectory data is easy to be copied and stolen in processes of sharing and transmission, and copyright protection problems caused by the trajectory data seriously hinder the publicity and scientific research of trajectory data. Therefore, how to effectively protect the copyright of trajectory data has become an urgent problem to be solved.

Digital watermarking technology embeds information into host data in a hidden way (Liu, X.-L., Lin, C.-C., & Yuan, S.-M. (2018). Blind Dual Watermarking for Color Images' Authentication and Copyright Protection. IEEE Transactions on Circuits and Systems for Video Technology, 28(5), 1047-1055.), which is one of the important technologies for copyright protection. Digital watermarking has proven to be an effective tool for identifying sources, creators, owners, distributors, or authorized users of images, audio, video, and geographic data. However, the research on applying digital watermarking technology to copyright protection of trajectory data is very scarce. Jing et al. (sJin, X., Zhang, Z., Wang, J., & Li, D. (2005). Watermarking Spatial Trajectory Database. In L. Zhou, B. C. Ooi, & X. Meng (Eds.), Database Systems for Advanced Applications (pp. 56-67). Springer.) embed watermark information by modifying a decimal place of a distance ratio of trajectory feature points. Lucchese et al. (Lucchese C, Vlachos M, Rajan D, et al. Rights protection of trajectory datasets with nearest-neighbor preservation[J]. Vldb Journal, 2010, 19(4):531-556.) embed watermark information into discrete Fourier transform coefficients of trajectories. Mingliang Yue (Mingliang Yue, Research on copyright protection and integrity verification methods for geographic data [D]. Wuhan University, 2015) embeds watermark information into distances of feature positions in trajectory flow data from the aspect of trajectory flow. Chunlei Wen (Chunlei Wen, Research on Integrity Detection Methods for Trajectory Data [D]. Shihezi University, 2017) embeds a group watermark and a trajectory point watermark into the least significant bit and the second least significant bit of the trajectory point coordinates for the integrity detection of the trajectory data. Pan et al. (Pan Z, Bao J, Zhang W, et al. TrajGuard: A Comprehensive Trajectory Copyright Protection Scheme[C]// the 25th ACM SIGKDD International Conference. ACM, 2019.) embed watermarks by adjusting a centroid distance of sub trajectories.

However, the above trajectory data digital watermarking algorithms are lossy, that is, coordinates of trajectory data are modified. As high-precision data, accuracy of the trajectory data is compressed, the quality of trajectory data is compressed, resulting in obstacles to the use of trajectory data. Therefore, more attention should be paid to the research of lossless watermarks of trajectory data.

As a kind of spatio-temporal big data, trajectory data has the same spatial characteristics as vector geographic data. Therefore, the development of lossless watermarks of vector geographic data can provide a reference for the lossless watermarks of trajectory data. The existing lossless watermarks of vector geographic data can be divided into two categories: embedded lossless watermarks and constructive lossless watermarks. Most of the embedded lossless watermarks are reversible watermarks, which can embed the watermark information into original data and recover the original data losslessly when the watermark information is extracted. However, reversible watermarks needs to delete the embedded watermark information before it is put into use, which can not provide copyright protection for the data in use. Obviously, this cannot meet the needs of copyright protection of trajectory data.

Constructive lossless watermarks, also known as zero watermarking, refers to a watermark sequence being constructed based on important and stable features of the data itself, without modifying the data. Zero watermarking is an ideal solution for copyright protection of trajectory data. At present, there is no algorithm that applies zero watermarking to trajectory data, and the present disclosure can fill the gap in this area.

SUMMARY

The present disclosure is provided to solve the above problems in the prior art. Therefore, a generation method of zero watermarking for trajectory data, a detection method of zero watermarking for trajectory data, a generation device of zero watermarking for trajectory data, a detection device of zero watermarking for trajectory data, and a storage medium are needed. The present disclosure aims to solve the problems of illegal acquisition, data tampering and copyright ownership in processes of transmitting and using the trajectory data, and meet the lossless requirement of data precision. The present disclosure can realize the construction and detection of watermark information without changing the data precision, and the watermark information constructed by the present disclosure has higher robustness.

In a first solution of the present disclosure, a generation method of zero watermarking for trajectory data is provided. The generation method includes:
generating copyright information;
compressing a trajectory T composed of trajectory data, thereby obtaining a compressed trajectory $T_{dp}$ and a compressed trajectory $T_{tdtr}$; wherein a Euclidean distance threshold (also referred to as a vertical Euclidean distance) and a maximum synchronous Euclidean distance threshold (also referred to as a time synchronization Euclidean distance) are keys for compressing the trajectory T;
deleting starting points in the compressed trajectory $T_{dp}$ and the compressed trajectory $T_{tdtr}$, and taking an intersection of the compressed trajectory $T_{dp}$ and the compressed trajectory $T_{tdtr}$ after deleting the starting points to obtain a trajectory T';
calculating a minimum area bounding rectangle (MABR) of the trajectory T', taking midpoints of four sides of the minimum area bounding rectangle to divide the trajectory T' into four equal parts;

counting the number of trajectory feature points in each of the four equal parts, selecting a vertex of the minimum area bounding rectangle in one of the four equal parts with the highest number of trajectory feature points as an origin, taking a longer side of the minimum area bounding rectangle connected to the vertex as an X-axis, taking a shorter side of the minimum area bounding rectangle connected to the vertex as a Y-axis, thereby constructing a rectangular coordinate system;

taking ω as a key and dividing the trajectory T' into ω×ω child trajectories based on the rectangular coordinate system, wherein each of the child trajectories has a child trajectory index (childx, childy);

taking ε as a key and dividing each of the child trajectories into ε×ε child blocks, traversing each of the child blocks, assigning a value of 1 to each of the child blocks containing at least one of the trajectory feature points, assigning a value of 0 to each of the child blocks without any one of the trajectory feature points, and obtaining a binary image PB having ε×ε pixels of each of the child trajectories based on assignment results of the child blocks;

acquiring a row index $x_i$ and a column index $y_i$ of each of pixels assigned with the value of 1 in the binary image PB, taking the row index $x_i$ and the column index $y_i$ as variables to calculate a linear invariant moment, thereby obtaining seven moment invariants $I(I_1, I_2, I_3, I_4, I_5, I_6, I_7)$;

quantifying the four moment invariants $I_1, I_2, I_3$, and $I_4$ to 0 or 1, and then splicing the quantified moment invariants to obtain a binary sequence M with a length of 4;

calculating an average value subx of row indexes and an average value suby of column indexes of the pixels assigned with the value of 1 in the binary image PB; sequentially splicing the average value subx and the average value suby with the child trajectory index (childx, childy) and a corresponding trajectory number id in that order, and using a hash function to calculate a watermark index W index;

mapping the binary sequence M to positions [1, N] based on the watermark index $W_{index}$, selecting and combining each bit on the mapped binary sequence to form a combined binary sequence, and then combining watermark bits of the combined binary sequence to define a zero watermarking sequence Watermarkbit with a length of N; and obtaining copyright watermark information CopyrightInfor based on the zero watermarking sequence Watermarkbit and the copyright information.

In an embodiment, the generating copyright information includes:
acquiring a binary copyright image I having n×n pixels;
encrypting the binary copyright image I; and
converting the encrypted binary copyright image into a one-dimensional binary sequence IB with a length of N.

In an embodiment, the obtaining copyright watermark information CopyrightInfor based on the zero watermarking sequence Watermarkbit and the copyright information includes: performing an exclusive-or operation on the zero watermarking sequence Watermarkbit and the one-dimensional binary sequence IB to obtain the copyright watermark information CopyrightInfor.

In a second solution of the present disclosure, a generation device of zero watermarking for trajectory data is provided. The generation device includes a processor. The processor is configured for:

generating copyright information;
compressing a trajectory T composed of trajectory data, thereby obtaining a compressed trajectory $T_{dp}$ and a compressed trajectory $T_{tdtr}$, wherein a Euclidean distance threshold and a maximum synchronous Euclidean distance threshold are keys for compressing the trajectory T;

deleting starting points in the compressed trajectory $T_{dp}$ and the compressed trajectory $T_{tdtr}$, and taking an intersection of the compressed trajectory $T_{dp}$ and the compressed trajectory $T_{tdtr}$ after deleting the starting points to obtain a trajectory T';

calculating a minimum area bounding rectangle of the trajectory T', and taking midpoints of four sides of the minimum area bounding rectangle to divide the trajectory T' into four equal parts;

counting the number of trajectory feature points in each of the four equal parts, selecting a vertex of the minimum area bounding rectangle in one of the four equal parts with the highest number of trajectory feature points as an origin, taking a longer side of the minimum area bounding rectangle connected to the vertex as an X-axis, taking a shorter side of the minimum area bounding rectangle connected to the vertex as a Y-axis, thereby constructing a rectangular coordinate system;

taking ω as a key and dividing the trajectory T' into ω×ω child trajectories based on the rectangular coordinate system, wherein each of the child trajectories has a child trajectory index (childx, childy);

taking ε as a key and dividing each of the child trajectories into ε×ε child blocks, traversing each of the child blocks, assigning a value of 1 to each of the child blocks containing at least one of the trajectory feature points, assigning a value of 0 to each of the child blocks without any one of the trajectory feature points, and obtaining a binary image PB having ε×ε pixels of each of the child trajectories based on assignment results of the child blocks;

acquiring a row index $x_i$ and a column index $y_i$ of each of pixels assigned with the value of 1 in the binary image PB, taking the row index $x_i$ and the column index $y_i$ as variables to calculate a linear invariant moment, thereby obtaining seven moment invariants $I(I_1, I_2, I_3, I_4, I_5, I_6, I_7)$;

quantifying the four moment invariants $I_1, I_2, I_3$, and $I_4$ to 0 or 1, and then splicing the quantified moment invariants to obtain a binary sequence M with a length of 4;

calculating an average value subx of row indexes and an average value suby of column indexes of the pixels assigned with the value of 1 in the binary image PB; sequentially splicing the average value subx and the average value suby with the child trajectory index (childx, childy) and a corresponding trajectory number id in that order, and using a hash function to calculate a watermark index W index;

mapping the binary sequence M to positions [1, N] based on the watermark index $W_{index}$, selecting and combining each bit on the mapped binary sequence to form a combined binary sequence, and then combining watermark bits of the combined binary sequence to define a zero watermarking sequence Watermarkbit with a length of N; and obtaining copyright watermark information CopyrightInfor based on the zero watermarking sequence Watermarkbit and the copyright information.

In an embodiment, the processor is further configured for:
acquiring a binary copyright image I having n×n pixels;

encrypting the binary copyright image I; and converting the encrypted binary copyright image into a one-dimensional binary sequence IB with a length of N.

In an embodiment, the processor is further configured for:

performing an exclusive-or operation on the zero watermarking sequence Watermarkbit and the one-dimensional binary sequence IB to obtain the copyright watermark information CopyrightInfor.

In a third solution of the present disclosure, a detection method of zero watermarking for trajectory data is provided. The detection method includes:

using the generation method to generate a watermark sequence Watermarkbit' of trajectory data to be detected;

performing an exclusive-or operation on the watermark sequence Watermarkbit' and a one-dimensional binary sequence IB to obtain copyright watermark information CopyrightInfor' generated by the trajectory data to be detected; and performing a similarity detection between the copyright watermark information CopyrightInfor' and copyright watermark information CopyrightInfor generated by original data to obtain a similarity value, and determining whether the trajectory data to be detected and the original data are the same data based on the similarity value and a preset similarity threshold.

In an embodiment, the determining whether the trajectory data to be detected and the original data are the same data based on the similarity value and a preset similarity threshold includes:

in response to the similarity value exceeding the similarity threshold, determining that the trajectory data to be detected and the original data are the same data; and in response to the similarity value not exceeding the similarity threshold, determining that the trajectory data to be detected and the original data are not the same data.

In a fourth solution of the present disclosure, a detection device of zero watermarking for trajectory data is provided. The detection device includes a processor, and the processor is configured for:

using the generation method to generate a watermark sequence Watermarkbit' of trajectory data to be detected;

performing an exclusive-or operation on the watermark sequence Watermarkbit' and a one-dimensional binary sequence IB to obtain copyright watermark information CopyrightInfor' generated by the trajectory data to be detected; and performing a similarity detection between the copyright watermark information CopyrightInfor' and copyright watermark information CopyrightInfor generated by original data to obtain a similarity value, and determining whether the trajectory data to be detected and the original data are the same data based on the similarity value and a preset similarity threshold.

In a fifth solution of the present disclosure, a non-transitory computer-readable storage medium having instructions stored thereon is provided. When the instructions are performed by a processor, the above generation method is performed.

According to the generation method, the detection method, the generation device, the detection device, and the storage medium of zero watermarking for trajectory data, the present disclosure has the following technical effects.

The present disclosure divides a trajectory based on the coordinate system constructed by trajectory feature points of trajectory data into blocks, and then the moment invariant of trajectory in each block is used to construct a watermark sequence, which can achieve copyright protection without modifying the trajectory data. In addition, since the present disclosure uses moment invariants which can represent overall features of the trajectory to construct watermark sequences, the present disclosure has strong stability in the face of common attacks and can resist almost all common types of attacks.

BRIEF DESCRIPTION OF DRAWINGS

In the drawings which are not necessarily drawn to scale, the same reference numerals may describe similar components in different views. The same reference numerals with a letter suffix or a different letter suffix may refer to similar components. The drawings illustrate various embodiments by way of example, not by way of limitation. The drawings combine the specification and claims to explain the embodiments of the present disclosure. Where appropriate, the same reference numerals used in the drawings refer to the same or similar components. Such embodiments are exemplary and are not intended to limit the present disclosure.

FIG. 6a illustrates a copyright image obtained by the generation method of the present disclosure; and FIG. 6b illustrates copyright watermark information obtained by the generation method of the present disclosure.

FIG. 7a illustrates data subjected to an overall rotation attack and a detection result.

DETAILED DESCRIPTION OF EMBODIMENTS

For those skilled in the art to better understand the technical solutions of the present disclosure, the following is a detailed description of the present disclosure with reference to the drawings and the specific embodiments. The embodiments of the present disclosure will be described in further detail below with reference to the drawings and specific embodiments, but not as a limitation of the present disclosure. The order of the steps described herein as an example should not be construed as a limitation when there is no necessity of a contextual relationship between them, and those skilled in the art should know that the order can be adjusted as long as the logic between them is not contradictory and the whole process can be realized.

Embodiment 1

A generation method of zero watermarking for trajectory data is provided. As shown in FIG. 1 to FIG. 4, the generation method includes the following steps 1 and 2.

In step 1, copyright information is generated.
Specifically, the step 1 includes:
step 1.1: acquiring a binary copyright image I having n×n pixels;
step 1.2: using a secret key as a parameter for Logistic algorithm to encrypt the binary copyright image I;
step 1.3: converting the encrypted binary copyright image into a one-dimensional binary sequence IB with a length of N.

Figure 3:
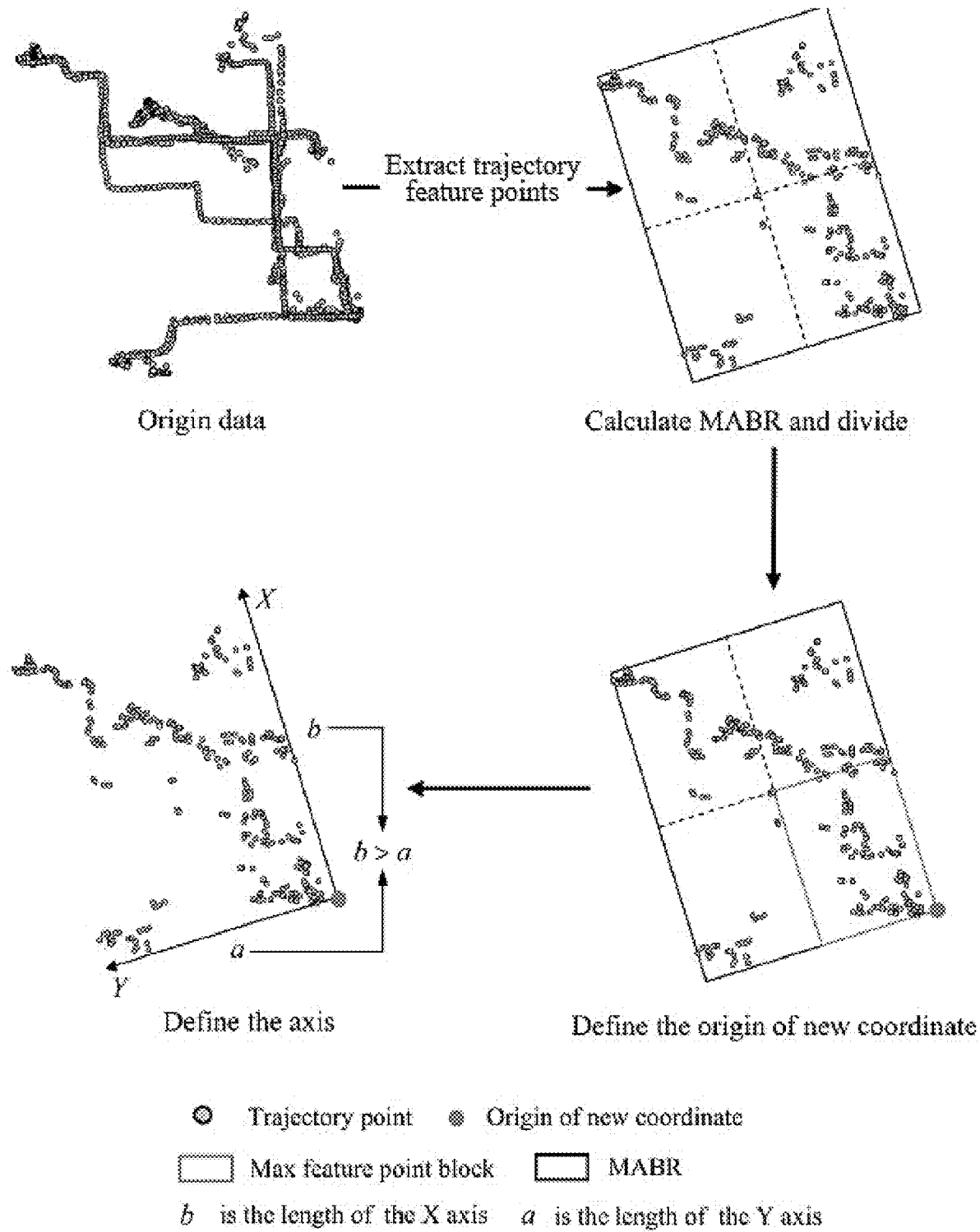
FIG. 3 illustrates a flowchart of constructing a coordinate system based on a trajectory.
Figure 4:
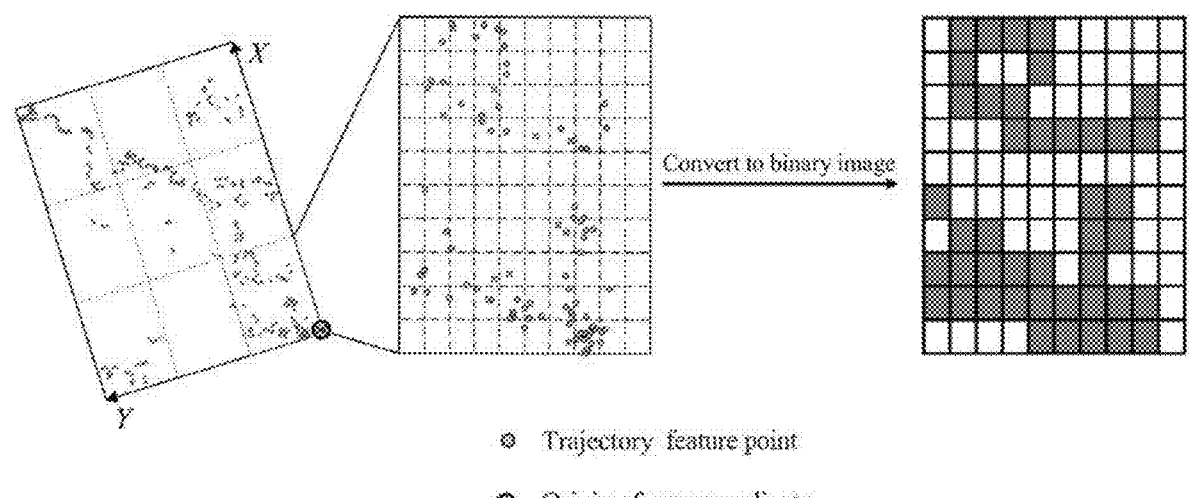
FIG. 4 illustrates a flowchart of converting a child trajectory into a binary image.
Figure 5:
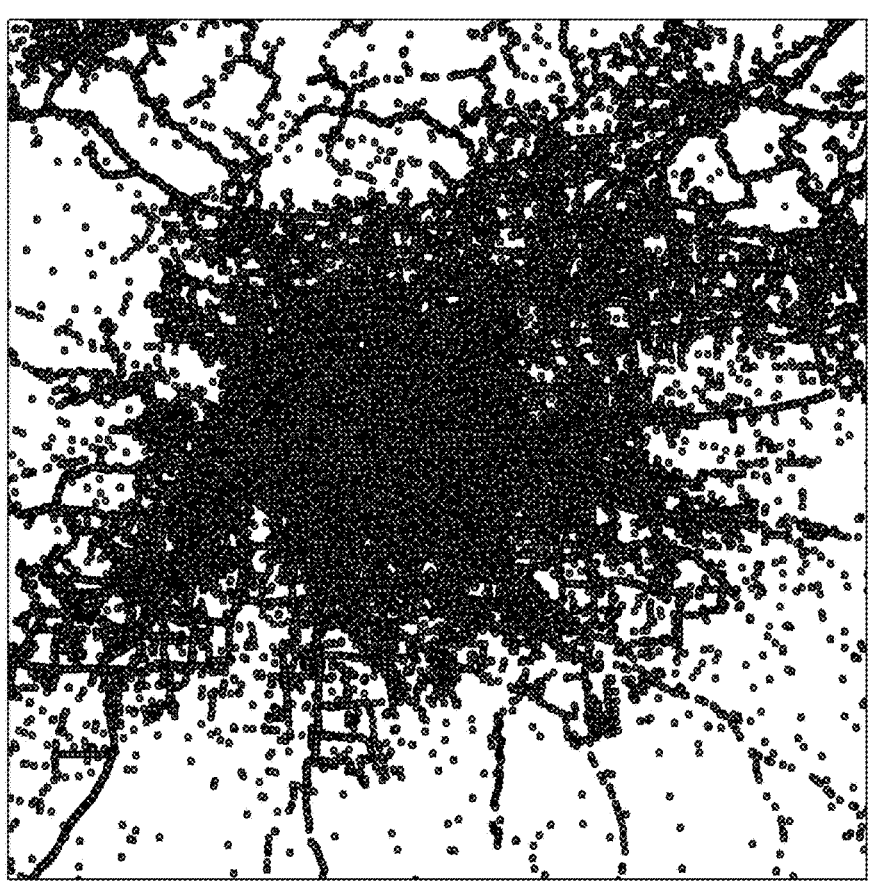
FIG. 5 illustrates experimental data of the generation method of zero watermarking of the present disclosure.
Figure 7B:
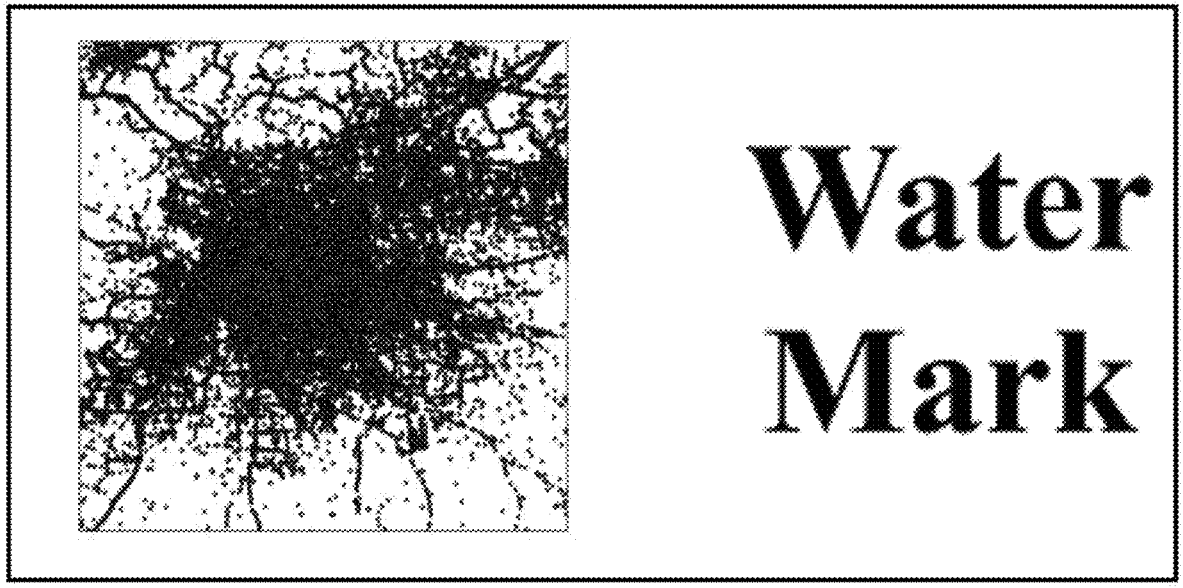
FIG. 7b illustrates data subjected to an overall translation attack and a detection result.
Figure 7C:
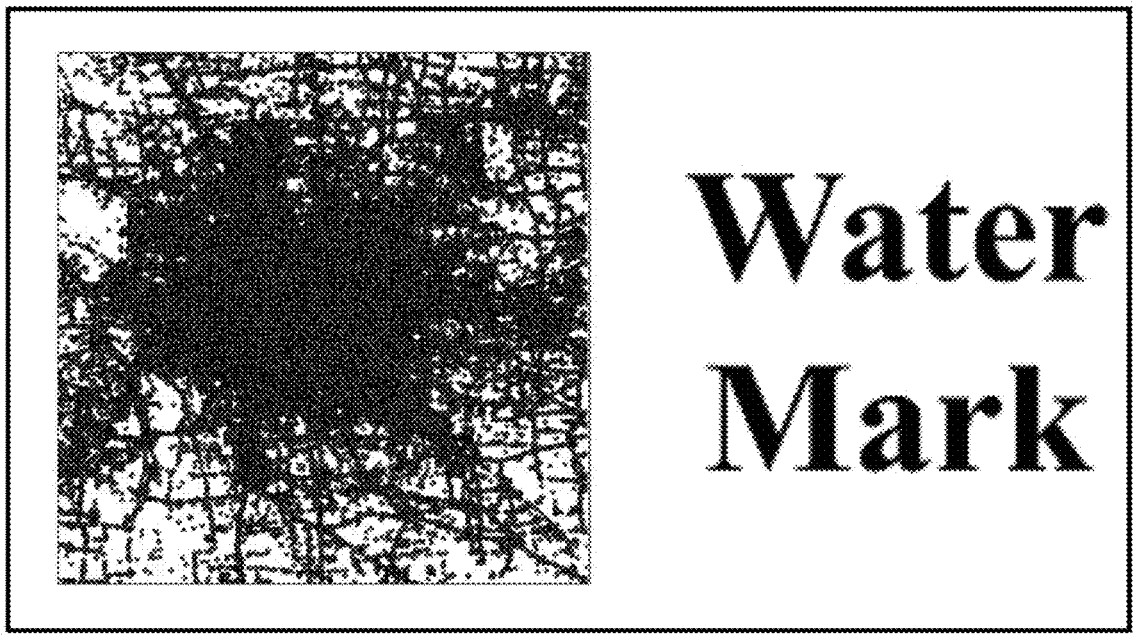
FIG. 7c illustrates data subjected to an overall scaling attack and a detection result.
Figure 7D:
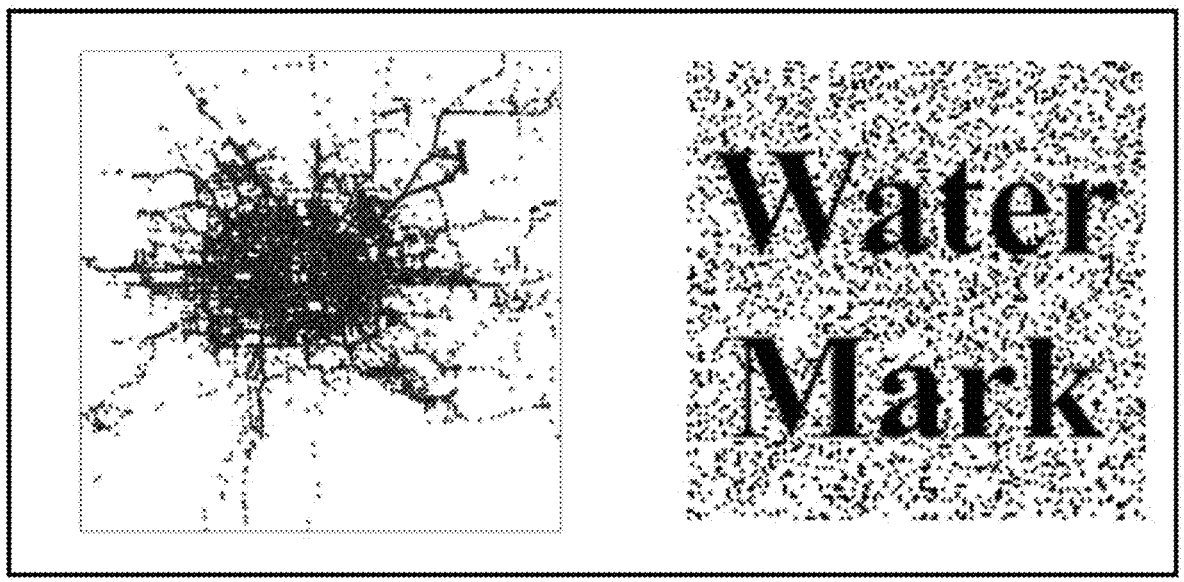
FIG. 7d illustrates data subjected to a random deletion attack of trajectory feature points and a detection result.

In step 2, copyright watermark information is generated.
Specifically, the step 2 includes:
step 2.1: using Douglas-Peucker algorithm and Top-Down Time-Ratio algorithm to separately compress a trajectory T composed of trajectory data, thereby obtaining a compressed trajectory $T_{dp}$ and a compressed trajectory $T_{tdtr}$, a vertical Euclidean distance and a time synchronization Euclidean distance being taken as keys of the two algorithms respectively for compressing the trajectory T;
step 2.2: deleting starting points in the compressed trajectory $T_{dp}$ and the compressed trajectory $T_{tdtr}$, and taking an intersection of the compressed trajectory $T_{dp}$ and the compressed trajectory $T_{tdtr}$ after deleting the starting points to obtain a trajectory T';
step 2.3: calculating a minimum area bounding rectangle (MABR) of the trajectory T', taking midpoints of four sides of the minimum area bounding rectangle to divide the trajectory T' into four equal parts;
step 2.4: counting the number of trajectory feature points in each of the four equal parts, selecting a vertex of the minimum area bounding rectangle in one of the four equal parts with the highest number of trajectory feature points as an origin, taking a longer side of the minimum area bounding rectangle connected to the vertex as an X-axis, taking a shorter side of the minimum area bounding rectangle connected to the vertex as a Y-axis, thereby constructing a rectangular coordinate system;
step 2.5: taking ω as a key and dividing the trajectory T' into ω×ω child trajectories based on the rectangular coordinate system constructed in step 2.4, and each of the child trajectories having a child trajectory index (childx, childy);
step 2.6: taking ε as a key and dividing each of the child trajectories into ε×ε child blocks, traversing each of the child blocks, assigning a value of 1 to each of the child blocks containing at least one of the trajectory feature points, assigning a value of 0 to each of the child blocks without the trajectory feature points, and obtaining a binary image PB having ε×ε pixels based on assignment results of the child blocks;
step 2.7: acquiring a row index $x_i$ and a column index $y_i$ of each of pixels (the pixels are obtained based on the assignment results of the child blocks as shown in FIG. 3) assigned with the value of 1 in the binary image PB, taking the row index $x_i$ and the column index $y_i$ as variables to calculate a linear invariant moment, thereby obtaining seven moment invariants $I(I_1, I_2, I_3, I_4, I_5, I_6, I_7)$,
step 2.8: quantifying the four moment invariants $I_1, I_2, I_3$, and $I_4$ to 0 or 1, and then splicing the quantified moment invariants to obtain a binary sequence M with a length of 4;
step 2.9: calculating an average value subx of row indexes and an average value suby of column indexes of the pixels assigned with the value of 1 in the binary image PB; sequentially splicing the average value subx and the average value suby with the child trajectory index (childx, childy) and a corresponding trajectory number id in that order, and using a hash function to calculate a watermark index $W_{inde}$; repeating the step 2.6 to step 2.9 to calculate all child trajectories, thereby obtaining a binary sequence and a watermark index of each of the child trajectories;
step 2.10: each of trajectories in a trajectory data set being subject to the step 2.1 to the step 2.9, thereby obtaining a corresponding binary sequence set and a corresponding watermark index set;
step 2.11: mapping the binary sequence M to positions [1, N] based on the watermark index $W_{index}$, using a majority voting method to select and combine each bit on the mapped binary sequence to form a combined binary sequence, and then combining watermark bits of the combined binary sequence to define a zero watermarking sequence Watermarkbit with a length of N; and
step 2.12: performing an exclusive-or operation on the zero watermarking sequence Watermarkbit and the one-dimensional binary sequence IB to obtain the copyright watermark information CopyrightInfor.

Specifically, the step 2.11 includes: mapping bits of the binary sequence M to obtain a mapped binary sequence with watermark bits (also shorted as bits) corresponding to the bits of the binary sequence M, using a majority voting method to determine each watermark bit of the mapped binary when bits of multiple binary sequences are mapped on a same watermark bit, then combining watermark bits of the mapped binary sequence to define a zero watermarking sequence Watermarkbit with a length of N. Furthermore, when a watermark bit of the zero watermarking sequence Watermarkbit is not mapped by a single bit of a binary sequence, which means that the watermark bit of the watermarking sequence Watermarkbit is mapped by multiple bits of multiple binary sequence; and the majority voting method is as follows: when the number of the bits assigned with 1 is more than or equal to the number of the bits assigned with 0, the watermark bit of the zero watermarking sequence Watermarkbit is assigned with 1, otherwise the watermark bit of the zero watermarking sequence Watermarkbit is assigned with 0.

Embodiment 2

Figure 1:
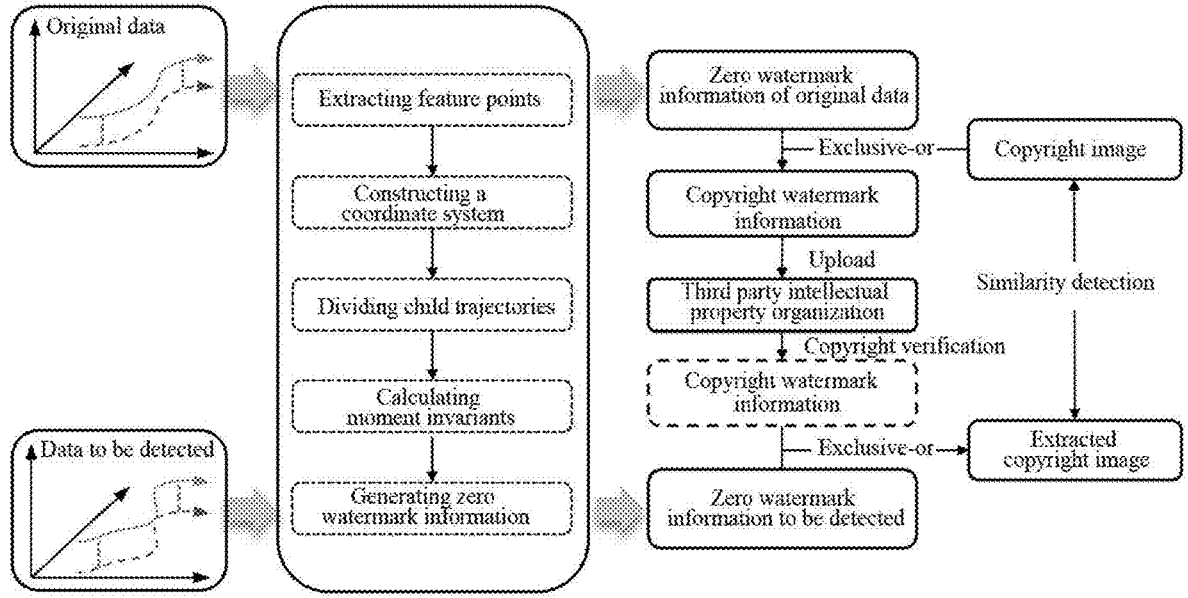
FIG. 1 illustrates a flowchart of generating and detecting copyright watermark information of the present disclosure.
Figure 2:
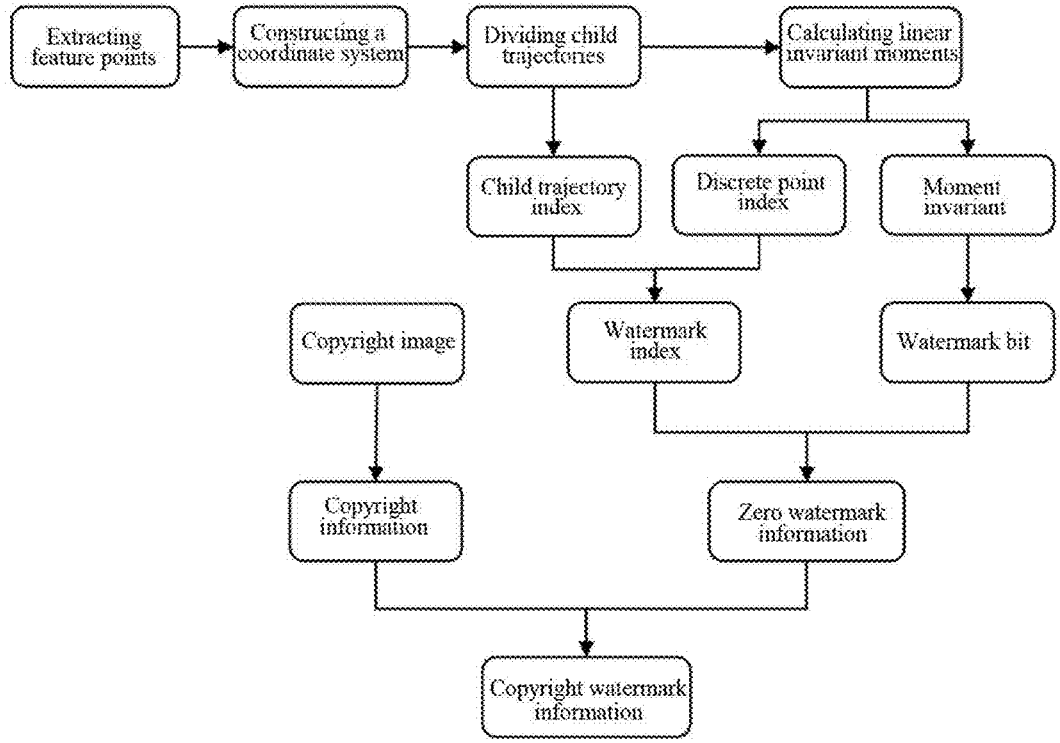
FIG. 2 illustrates a flowchart of generating copyright watermark information of the present disclosure.

A detection method of zero watermarking for trajectory data provided by the present disclosure is shown in FIG. 1, the detection method includes:
step 3.1: using the step 2 to generate a watermark sequence Watermarkbit' based on trajectory data to be detected;
step 3.2: performing an exclusive-or operation on the watermark sequence Watermarkbit' and the one-dimensional binary sequence IB to obtain copyright watermark information CopyrightInfor' generated by the trajectory data to be detected; and
step 3.3: performing a similarity detection between the copyright watermark information CopyrightInfor' and the copyright watermark information CopyrightInfor generated by original data to obtain a similarity value, determining whether the trajectory data to be detected and the original data are the same data by comparing the similarity value with a preset similarity threshold.

Embodiment 3

A trajectory data set containing 3435 trajectories is selected in the embodiment, the embodiment of the present disclosure (including generation and detection of copyright watermark information) aims to illustrate processes of generating copyright information, generating and detecting copyright watermark information.

The trajectory data set containing 3435 trajectories is subject to the following steps 1-3.

In step 1, copyright information is generated.

The step 1 includes:

step 1.1: selecting a binary image as shown in FIG. 6a that can verify copyright information; and step 1.2: using Logistic algorithm to encrypt the binary image, and converting the encrypted copyright image into a one-dimensional binary sequence.

In step 2, copyright watermark information is embedded.

The step 2 includes:

step 2.1: calculating a minimum area bounding rectangle of trajectory feature points of trajectory data, constructing a rectangular coordinate system based on the minimum area bounding rectangle; and step 2.2: dividing the trajectory into blocks based on the minimum area bounding rectangle, calculating moment invariants in each of the blocks, performing an exclusive-or operation on a zero watermarking sequence generated by quantifying the moment invariants and copyright information to obtain copyright watermark information as shown in FIG. 6b.

In step 3, copyright watermark information is detected.

The step 3 includes:

step 3.1: calculating a minimum area bounding rectangle of feature points of trajectory data to be detected, constructing a rectangular coordinate system based on the minimum area bounding rectangle;

step 3.2: dividing the trajectory into blocks based on the minimum area bounding rectangle, calculating moment invariants in each of the blocks, performing an exclusive-or operation on a zero watermarking sequence generated by quantifying the moment invariants and copyright information to obtain copyright watermark information; and step 3.3: comparing a similarity between the calculated copyright watermark information and the copyright watermark information generated from the original data; determining the trajectory data to be detected and the original data are the same data when the similarity exceeds a similarity threshold, otherwise the trajectory data to be detected and the original data are different data.

The generation method of zero watermarking for trajectory data provided by the present disclosure is a method for generating zero watermarking for trajectory data. This method can protect the copyright of trajectory data without changing the data precision and has strong robustness.

The watermark information generated by the generation method of the present disclosure is subject to the following tests and analyses.

(1) Generation and Detection of Copyright Watermark Information

The watermark information constructed from the original trajectory data and the binary image with copyright information of "Water Mark" are subject to an exclusive-or operation to generate copyright watermark information. Then use the same method to construct copyright watermark information from the trajectory data to be detected. The experimental results show that the copyright watermark information generated by the data to be detected is the same as the copyright watermark information constructed from the original data.

(2) Anti Modification Attack Test

The modification attack on trajectory data refers to its intentional or unintentional modification, including overall rotation, overall translation, overall scaling, and random deletion of trajectory points. As shown in FIG. 7a to FIG. 7d, the test results show that the generation method of the present disclosure can correctly construct the correct watermark information for trajectory data subjected to different types of attacks, effectively protecting the copyright information of the data.

Furthermore, although exemplary embodiments have been described herein, the scope of the present disclosure includes any embodiments having equivalent elements, modifications, omissions, combinations (e.g., intersections of various embodiments), adaptations, or changes based on the present disclosure. The elements in the claims should be interpreted broadly and are not to be limited to the embodiments described in the present disclosure. Embodiments in the specification are to be interpreted as exemplary. Accordingly, the specification and embodiments are intended to be considered as exemplary only, the true scope and spirit of the present disclosure are indicated by the claims and equivalents of the claims.

The above description is intended to be illustrative and not restrictive. For example, the above embodiments (or one or more solutions thereof) may be used in combination with each other. For example, other embodiments may be obtained by those skilled in the art after reading the above description. In addition, in the above description, various features may be grouped together to simplify the present disclosure. It is not intended to determine features of the present disclosure not claimed are essential to any claim; on the contrary, features in the subject matter of the present disclosure may be less than all of the features of a particular embodiment. The embodiments of the present disclosure can be combined with each other. The scope of the present disclosure should be determined with reference to the claims and equivalents of the claims.

What is claimed is:

1. A generation method of zero watermarking for trajectory data, comprising:

generating copyright information;

compressing a trajectory T composed of trajectory data, thereby obtaining a compressed trajectory $T_{dp}$ and a compressed trajectory $T_{tdtr}$, wherein a Euclidean distance threshold and a maximum synchronous Euclidean distance threshold are keys for compressing the trajectory T;

deleting starting points in the compressed trajectory $T_{dp}$ and the compressed trajectory $T_{tdtr}$, and taking an intersection of the compressed trajectory $T_{dp}$ and the compressed trajectory $T_{tdtr}$ after deleting the starting points to obtain a trajectory T';

calculating a minimum area bounding rectangle of the trajectory T', and taking midpoints of four sides of the minimum area bounding rectangle to divide the trajectory T' into four equal parts;

counting the number of trajectory feature points in each of the four equal parts, selecting a vertex of the minimum area bounding rectangle in one of the four equal parts with the highest number of trajectory feature points as an origin, taking a longer side of the minimum area bounding rectangle connected to the vertex as an X-axis, taking a shorter side of the minimum area bounding rectangle connected to the vertex as a Y-axis, thereby constructing a rectangular coordinate system;

taking ω as a key and dividing the trajectory T' into ω×ω child trajectories based on the rectangular coordinate system, wherein each of the child trajectories has a child trajectory index (childx, childy);

taking ε as a key and dividing each of the child trajectories into ε×ε child blocks, traversing each of the child blocks, assigning a value of 1 to each of the child blocks containing at least one of the trajectory feature points, assigning a value of 0 to each of the child blocks without any one of the trajectory feature points, and obtaining a binary image PB having ε×ε pixels of each of the child trajectories based on assignment results of the child blocks;

acquiring a row index $x_i$ and a column index $y_i$ of each of pixels assigned with the value of 1 in the binary image PB, taking the row index $x_i$ and the column index $y_i$ as variables to calculate a linear invariant moment, thereby obtaining seven moment invariants $I(I_1, I_2, I_3, I_4, I_5, I_6, I_7)$;

quantifying the four moment invariants $I_1, I_2, I_3$, and $I_4$ to 0 or 1, and then splicing the quantified moment invariants to obtain a binary sequence M with a length of 4;

calculating an average value subx of row indexes and an average value suby of column indexes of the pixels assigned with the value of 1 in the binary image PB; sequentially splicing the average value subx and the average value suby with the child trajectory index (childx, childy) and a corresponding trajectory number id in that order, and using a hash function to calculate a watermark index $W_{index}$;

mapping the binary sequence M to positions [1, N] based on the watermark index $W_{index}$, selecting and combining each bit on the mapped binary sequence to form a combined binary sequence, and then combining watermark bits of the combined binary sequence to define a zero watermarking sequence Watermarkbit with a length of N; and obtaining copyright watermark information CopyrightInfor based on the zero watermarking sequence Watermarkbit and the copyright information.

2. The generation method of zero watermarking for trajectory data as claimed in claim 1, wherein the generating copyright information comprises:

acquiring a binary copyright image I having n×n pixels; encrypting the binary copyright image I; and converting the encrypted binary copyright image into a one-dimensional binary sequence IB with a length of N.

3. The generation method of zero watermarking for trajectory data as claimed in claim 2, wherein the obtaining copyright watermark information CopyrightInfor based on the zero watermarking sequence Watermarkbit and the copyright information comprises: performing an exclusive-or operation on the zero watermarking sequence Watermarkbit and the one-dimensional binary sequence IB to obtain the copyright watermark information CopyrightInfor.

4. A generation device of zero watermarking for trajectory data, comprising: a processor; wherein the processor is configured for:

generating copyright information;

compressing a trajectory T composed of trajectory data, thereby obtaining a compressed trajectory $T_{dp}$ and a compressed trajectory $T_{tdtr}$, wherein a Euclidean distance threshold and a maximum synchronous Euclidean distance threshold are keys for compressing the trajectory T;

deleting starting points in the compressed trajectory $T_{dp}$ and the compressed trajectory $T_{tdtr}$, and taking an intersection of the compressed trajectory $T_{dp}$ and the compressed trajectory $T_{tdtr}$ after deleting the starting points to obtain a trajectory T';

calculating a minimum area bounding rectangle of the trajectory T', and taking midpoints of four sides of the minimum area bounding rectangle to divide the trajectory T' into four equal parts;

counting the number of trajectory feature points in each of the four equal parts, selecting a vertex of the minimum area bounding rectangle in one of the four equal parts with the highest number of trajectory feature points as an origin, taking a longer side of the minimum area bounding rectangle connected to the vertex as an X-axis, taking a shorter side of the minimum area bounding rectangle connected to the vertex as a Y-axis, thereby constructing a rectangular coordinate system;

taking ω as a key and dividing the trajectory T' into ω×ω child trajectories based on the rectangular coordinate system, wherein each of the child trajectories has a child trajectory index (childx, childy);

taking ε as a key and dividing each of the child trajectories into ε×ε child blocks, traversing each of the child blocks, assigning a value of 1 to each of the child blocks containing at least one of the trajectory feature points, assigning a value of 0 to each of the child blocks without any one of the trajectory feature points, and obtaining a binary image PB having ε×ε pixels of each of the child trajectories based on assignment results of the child blocks;

acquiring a row index $x_i$ and a column index $y_i$ of each of pixels assigned with the value of 1 in the binary image PB, taking the row index $x_i$ and the column index $y_i$ as variables to calculate a linear invariant moment, thereby obtaining seven moment invariants $I(I_1, I_2, I_3, I_4, I_5, I_6, I_7)$;

quantifying the four moment invariants $I_1, I_2, I_3$, and $I_4$ to 0 or 1, and then splicing the quantified moment invariants to obtain a binary sequence M with a length of 4;

calculating an average value subx of row indexes and an average value suby of column indexes of the pixels assigned with the value of 1 in the binary image PB; sequentially splicing the average value subx and the average value suby with the child trajectory index (childx, childy) and a corresponding trajectory number id in that order, and using a hash function to calculate a watermark index $W_{index}$;

mapping the binary sequence M to positions [1, N] based on the watermark index $W_{index}$, selecting and combining each bit on the mapped binary sequence to form a combined binary sequence, and then combining watermark bits of the combined binary sequence to define a zero watermarking sequence Watermarkbit with a length of N; and obtaining copyright watermark information CopyrightInfor based on the zero watermarking sequence Watermarkbit and the copyright information.

5. The generation device of zero watermarking for trajectory data as claimed in claim 4, wherein the processor is further configured for:

acquiring a binary copyright image I having n×n pixels; encrypting the binary copyright image I; and converting the encrypted binary copyright image into a one-dimensional binary sequence IB with a length of N.

6. The generation device of zero watermarking for trajectory data as claimed in claim 5, wherein the processor is further configured for:
  performing an exclusive-or operation on the zero watermarking sequence Watermarkbit and the one-dimensional binary sequence IB to obtain the copyright watermark information CopyrightInfor.

7. A detection method of zero watermarking for trajectory data, comprising:
  using the generation method as claimed in claim 1 to generate a watermark sequence Watermarkbit' of trajectory data to be detected;
  performing an exclusive-or operation on the watermark sequence Watermarkbit' and a one-dimensional binary sequence IB to obtain copyright watermark information CopyrightInfor' generated by the trajectory data to be detected; and
  performing a similarity detection between the copyright watermark information CopyrightInfor' and copyright watermark information CopyrightInfor generated by original data to obtain a similarity value, and determining whether the trajectory data to be detected and the original data are the same data based on the similarity value and a preset similarity threshold.

8. The detection method of zero watermarking for trajectory data as claimed in claim 7, wherein the determining whether the trajectory data to be detected and the original data are the same data based on the similarity value and a preset similarity threshold comprises:
  in response to the similarity value exceeding the similarity threshold, determining that the trajectory data to be detected and the original data are the same data; and
  in response to the similarity value not exceeding the similarity threshold, determining that the trajectory data to be detected and the original data are not the same data.

9. A detection device of zero watermarking for trajectory data, comprising: a processor; wherein the processor is configured for:
  using the generation method as claimed in claim 1 to generate a watermark sequence Watermarkbit' of trajectory data to be detected;
  performing an exclusive-or operation on the watermark sequence Watermarkbit' and a one-dimensional binary sequence IB to obtain copyright watermark information CopyrightInfor' generated by the trajectory data to be detected; and
  performing a similarity detection between the copyright watermark information CopyrightInfor' and copyright watermark information CopyrightInfor generated by original data to obtain a similarity value, and determining whether the trajectory data to be detected and the original data are the same data based on the similarity value and a preset similarity threshold.

10. A non-transitory computer-readable storage medium having instructions stored thereon, wherein when the instructions are performed by a processor, the generation method as claimed in claim 1 is performed.

* * * * *